(12) United States Patent
Hoefner

(10) Patent No.: US 11,456,508 B2
(45) Date of Patent: Sep. 27, 2022

(54) BATTERY MODULE, HIGH-VOLTAGE BATTERY, AND MOTOR VEHICLE

(71) Applicant: AUDI AG, Ingolstadt (DE)

(72) Inventor: Dirk Hoefner, Wellheim (DE)

(73) Assignee: AUDI AG, Ingolstadt (DE)

( * ) Notice: Subject to any disclaimer, the term of this patent is extended or adjusted under 35 U.S.C. 154(b) by 69 days.

(21) Appl. No.: 16/874,914

(22) Filed: May 15, 2020

(65) Prior Publication Data

US 2020/0365859 A1 Nov. 19, 2020

(30) Foreign Application Priority Data

May 15, 2019 (DE) ...................... 10 2019 207 084.1

(51) Int. Cl.
*H01M 50/30* (2021.01)
*A62C 3/07* (2006.01)
(Continued)

(52) U.S. Cl.
CPC ............. *H01M 50/394* (2021.01); *A62C 3/07* (2013.01); *B60L 50/64* (2019.02);
(Continued)

(58) Field of Classification Search
CPC .......... H01M 50/394; H01M 50/3425; H01M 50/383; H01M 50/317; H01M 10/0413; H01M 2220/20; H01M 2200/20; H01M 50/103; H01M 50/143; B60L 50/64; A62C 3/07
See application file for complete search history.

(56) References Cited

U.S. PATENT DOCUMENTS

2010/0215998 A1 8/2010 Byun et al.
2011/0195284 A1 8/2011 Yasui et al.
(Continued)

FOREIGN PATENT DOCUMENTS

CN 203339249 U 12/2013
CN 103972429 A 8/2014
(Continued)

OTHER PUBLICATIONS

Examination Report dated Mar. 20, 2020 in corresponding German application No. 10 2019 207 084.1; 14 pages including Machine-generated English-language translation.
Office Action dated May 5, 2022, in connection with corresponding Chinese Application No. 202010412552.9 (16 pp., including machine-generated English translation).

*Primary Examiner* — Matthew T Martin
*Assistant Examiner* — Jessie L. Walls
(74) *Attorney, Agent, or Firm* — Maier & Maier, PLLC

(57) ABSTRACT

The disclosure relates to a battery module having at least one battery cell, wherein the battery cell includes a cell housing, which includes a lower side and an upper side opposite to the lower side in a first direction, wherein an opening releasable in the event of an overpressure in the battery cell is arranged in the upper side. In this case, the battery module includes an atomizing device, which is arranged in the first direction above the releasable opening of the at least one battery cell, and which comprises at least one flame passage opening, through which flames escaping from the releasable opening of the battery cell can penetrate, and which comprises a passage area which is smaller than an area of the releasable opening.

11 Claims, 3 Drawing Sheets

(51) Int. Cl.
*H01M 50/342* (2021.01)
*H01M 50/383* (2021.01)
*B60L 50/64* (2019.01)
*H01M 50/103* (2021.01)
*H01M 50/143* (2021.01)
*H01M 50/358* (2021.01)
*H01M 50/209* (2021.01)
*H01M 10/04* (2006.01)
*H01M 50/317* (2021.01)

(52) U.S. Cl.
CPC ..... *H01M 10/0413* (2013.01); *H01M 50/103* (2021.01); *H01M 50/143* (2021.01); *H01M 50/317* (2021.01); *H01M 50/3425* (2021.01); *H01M 50/358* (2021.01); *H01M 50/383* (2021.01); *H01M 50/209* (2021.01); *H01M 2200/00* (2013.01); *H01M 2200/20* (2013.01); *H01M 2220/20* (2013.01)

(56) References Cited

U.S. PATENT DOCUMENTS

| | | | |
|---|---|---|---|
| 2011/0287286 A1* | 11/2011 | Ahn | H01M 50/3425 429/56 |
| 2019/0097203 A1 | 3/2019 | Kwag et al. | |

FOREIGN PATENT DOCUMENTS

| | | | | |
|---|---|---|---|---|
| CN | 205388985 U | | 7/2016 | |
| CN | 109585726 A | * | 4/2019 | .......... H01M 50/383 |
| DE | 10 2013 223 361 A1 | | 5/2015 | |
| DE | 10 2014 012 568 A1 | | 3/2016 | |
| EP | 1294032 A2 | | 3/2003 | |
| EP | 3 053 206 B1 | | 8/2017 | |
| JP | 2006338989 A | | 12/2006 | |
| JP | 2008117583 A | | 5/2008 | |
| JP | 201080352 A | | 4/2010 | |
| JP | 2016-54127 A | | 4/2016 | |

* cited by examiner

BATTERY MODULE, HIGH-VOLTAGE BATTERY, AND MOTOR VEHICLE

FIELD

The disclosure relates to a battery module having at least one battery cell, wherein the battery cell includes a cell housing, which comprises a lower side and an upper side opposite to the lower side in a first direction. In this case, an opening releasable in the event of an overpressure in the battery cell is arranged in the upper side. The disclosure also includes a high-voltage battery having such a battery module, and also a motor vehicle having such a battery module or having such a high-voltage battery.

BACKGROUND

Battery cells known from the prior art for battery modules, in particular in the automotive field, typically comprise, for emergency degassing, an opening releasable in the event of overpressure in the battery cell, on top in the cell cover, through which generally the poles of the respective battery cells are also provided, for example, a bursting membrane, which opens in the event of excessively high internal pressure. If, for example, an overpressure occurs in the battery cell in case of fault, for example, because of excessively strong heating of the battery cell, bursting of this membrane therefore also occurs as a result. In this case, a strong flame usually also escapes from this opening of the battery cell, which is then released.

In this context, DE 10 2013 223 361 A1 describes a battery cell having a cell housing and a safety valve, which is inserted into an opening of the cell housing and is designed to open if a cell internal pressure prevailing inside the cell housing increases above a threshold value and thus to enable a medium to flow out of the cell housing.

Furthermore, the battery cells in a battery module are usually only covered by a thin plastic cap. Therefore, a flame escaping from the cell housing penetrates very rapidly in the battery interior toward the battery cover, i.e., the cover of the entire battery housing, in which multiple such battery modules can be accommodated. Since the battery covers are usually manufactured from aluminum, the flame also penetrates such a cover in a very short time. The hazard thus exists that vehicle parts outside the battery housing will be set on fire. A more robust formation of such a housing cover, for example, from another material, for example, iron or steel, would dramatically increase the weight of such a high-voltage battery, however, which is thus desirably to be avoided.

In this context, DE 10 2014 012 568 A1 describes an accumulator device, in particular a stationary accumulator device, for use as an emergency power supply, which comprises a penetration barrier, which is supposed to prevent gases escaping outward from igniting in the event of a thermal chain reaction and thus endangering the surroundings of the accumulator device. Such a penetration barrier is to be provided in this case by a nonwoven material and/or porous material, which lets through gases arising in the galvanic cell, but not glowing particles and flames.

Such a penetration barrier, which is formed such that it does not let through glowing particles and flames, is not suitable for typical battery modules used in motor vehicles, however, since a penetration barrier formed in this manner would not enable a sufficiently rapid pressure equalization in case of a thermal event and/or overheating of a battery cell. This could result in an impermissibly high pressure buildup inside the battery cell and accordingly an uncontrolled explosion of this battery cell.

Furthermore, EP 3 053 206 B1 describes a battery module having a safety section in the module housing, which is designed so that it can burn through particularly rapidly to enable a rapid escape of flames and gases.

SUMMARY

This in turn results in the above described problems, namely that a penetrating flame can thus also penetrate the housing cover of the entire battery housing in a very short time and the hazard thus exists that vehicle parts outside the battery housing will be set on fire.

The object of the present disclosure is therefore to provide a battery module, a high-voltage battery, and a motor vehicle, which enable, in case of fault of a battery cell, in which the releasable opening in the cell housing of the battery cell is released due to an overpressure inside the battery cell, the risk that vehicle parts outside the battery module, in particular outside the entire high-voltage battery will be set on fire to be reduced, or such setting on fire at least to be delayed in time in the most efficient possible manner.

A battery module according to the invention comprises at least one battery cell, wherein the battery cell comprises a cell housing, which comprises a lower side and an upper side opposite to the lower side in a first direction. In this case, an opening releasable in the event of an overpressure in the battery cell is arranged in the upper side. Furthermore, the battery module comprises an atomizing device, which is arranged in the first direction above the releasable opening of the at least one battery cell and which comprises at least one flame passage opening, through which flames escaping from the releasable opening of the battery cell can pass, i.e., through which flames can pass, and which comprises a passage area which is smaller than an area of the releasable opening of the at least one battery cell.

Since a passage of a flame is advantageously not completely prevented by the atomizing device, the atomizing device advantageously still enables, in case of a fault of the battery cell and a strong gas development resulting therefrom, a sufficiently rapid pressure equalization, while the atomizing device advantageously enables the passing flame to be atomized by way of the at least one flame passage opening, whereby at least a direct penetration of such an abrasive flame onto, for example, battery covers located above the battery module can be prevented. Passing flames can advantageously be divided and/or scattered by one or more such flame passage openings, which advantageously significantly reduces the destructive extent of such a flame. Moreover, this measure may be implemented in a particularly efficient manner, since a formation of the battery cover itself from a fire resistant and accordingly heavy material is not required for this purpose. Therefore, the risk of burning through a battery cover located above the battery module can be significantly reduced or even entirely prevented by the atomizing and distributing of the passing flame enabled by the at least one flame passage opening, and it is nonetheless ensured that the pressure buildup in the battery module and in the battery cell remains in a permissible range.

The at least one battery cell can be formed, for example, as a lithium-ion battery cell. Furthermore, the battery module can also comprise multiple such battery cells, which are arranged, for example, in a cell pack. Moreover, multiple such battery modules can be accommodated in a shared battery housing to form a high-voltage battery. The battery cells are furthermore preferably formed as prismatic cells and therefore comprise a substantially cuboid cell housing. Furthermore, the terms "lower side" and "upper side" of the cell housing are to be understood with respect to the intended installation location of the battery module in the motor vehicle. In principle, however, the lower side and the upper side could generally also be referred to as the first and second side of the cell housing. The upper side of the cell housing furthermore preferably also provides the two poles of the at least one battery cell. The opening releasable in the event of overpressure in the upper side of the cell housing is then preferably located in the middle between these two poles, but in principle can also be arranged at any other arbitrary point of the upper side.

Furthermore, this releasable opening, as described at the outset, can be formed, for example, as a bursting membrane, which opens independently in the event of excessively high internal pressure inside the at least one battery cell, in that this bursting membrane ruptures because of this internal pressure. In general, the releasable opening can also be designed as a pressure relief valve. This bursting membrane or the releasable opening in general can be formed so that opening occurs if an overpressure in the battery cell exceeds a pre-definable threshold value, but the opening remains closed if this threshold value is not exceeded or at least a second threshold value below this first threshold value is not exceeded.

Furthermore, it is preferable for the atomizing device to be formed from a fire-resistant material. Such a material can be, for example, a ceramic and/or a fire-resistant metal or an alloy. For example, the material can comprise iron, steel, or also tempered steel, or another fire-resistant metal, for example, tungsten. Steel in particular is distinguished in this case by its high level of fire resistance and is moreover particularly cost-effective, so that it is preferable for the atomizing device to be formed at least in large part from steel. Furthermore, the atomizing device can be provided in the form of a sheet or insert, in which the at least one flame passage opening is arranged. This insert can then be arranged in a simple manner above the battery cell, in particular above the releasable opening in the upper side of the cell housing.

In one advantageous embodiment of the invention, the battery module comprises multiple battery cells that are arranged adjacent to one another in a longitudinal extension direction extending perpendicularly to the first direction, wherein the atomizing device is arranged extending in the longitudinal extension direction in the first direction above a respective releasable opening of a respective one of the battery cells. This has the advantage that such an atomizing device does not have to be provided separately for a respective battery cell, but rather the atomizing device can be used for all battery cells comprised by the battery module and accordingly can be formed in one piece, for example. This also in turn enables particularly simple, efficient, and cost-effective provision of this atomizing device.

In such a case, the battery cells are preferably also formed identically, at least with regard to the position of the respective releasable openings thereof in the cell housing, so that these releasable openings are also arranged along a line which extends in the direction of the longitudinal extension direction. The atomizing device can then also be formed in a particularly simple manner as an insert also extending along the longitudinal extension direction and accordingly above the respective releasable openings. Furthermore, the atomizing device then comprises at least one above-described flame passage opening per battery cell. The flame passage openings associated with the respective battery cells are then accordingly also preferably positioned in a region above the respective releasable openings in the cell housings of the battery cells. Thus, the flames escaping through the respective releasable openings from the cell housings can advantageously be atomized by the flame passage openings located above them.

It is particularly advantageous if the atomizing device comprises multiple, for example, two flame passage openings spaced apart from one another per battery cell comprised by the battery module. By providing multiple such flame passage openings, the flames passing through the releasable opening in the cell housing may be atomized even more efficiently.

in a further advantageous design of the invention, a surface normal of the passage area of the at least one flame passage opening is inclined at a nonzero angle with respect to the first direction. The surface normal is perpendicular to the passage area here. In other words, the passage area of the at least one flame passage opening is not aligned parallel to the upper side of the relevant battery cell, but rather is inclined, for example, at an angle in relation to this upper side of the battery cell.

By way of such an inclination of the flame passage opening, it may advantageously be effectuated that a flame passing through the releasable opening in the cell housing also does not directly pass further through this flame passage opening in the first direction, but rather is deflected to the side, for example. This effect can also be further amplified, for example, in that, as is provided according to a further advantageous design of the invention, the at least one flame passage opening is arranged laterally offset in a second direction perpendicular to the first direction, and in particular also perpendicular to the longitudinal extension direction, with respect to a center of the releasable opening of the at least one battery cell. To thus be able to pass through the atomizing device, the flame escaping from the releasable opening of the battery cell thus has to take a detour and is thereby automatically laterally deflected, which prevents direct striking of the flame thus finally atomized on the housing cover located above the battery module or at least reduces the influence which such a finally deflected and atomized flame still has on this battery cover.

Furthermore, it is also advantageous that, if the atomizing device comprises, for example, multiple such flame passage openings per battery cell, for example, comprises two such flame passage openings, they are accordingly inclined in opposition with respect to the first direction. The atomizing effect can thus additionally also be strengthened and the destructive extent of the flames can be further reduced.

In a further particularly advantageous design of the invention, the atomizing device comprises a lug, which is associated with the at least one flame passage opening, adjoins an edge region of the flame passage opening, protrudes in the direction of an opposing edge region of the at least one flame passage opening, and thus partially overlaps the at least one flame passage opening, for example, a type of projection which is inclined in relation to the passage area of the at least one flame passage opening by a nonzero angle.

The above-described deflection effect can advantageously also be additionally strengthened by such a lug, which at least partially overlaps the passage opening. Such a lug can be formed, for example, as a plate, for example, a metal plate, which partially protrudes over the passage opening.

Such a lug can, as is provided according to a further advantageous design of the invention, be aligned in parallel to the upper side of the at least one battery cell. By way of such a lug, the flame passing through the flame passage opening can advantageously be stopped from extending further upward on a direct path, but rather is guided laterally out of the flame passage opening by such a lug, which is formed in particular from the same material as the remaining atomizing device, since the lug cannot itself be penetrated by the flame. In other words, this lug is also formed from a fire-resistant material In particular, this lug can also be integrally formed with the remaining atomizing device.

In a further advantageous design of the invention, the atomizing device comprises a strip-shaped middle region, extending in particular in the longitudinal extension direction and aligned in parallel to the upper side of the at least one battery cell, which region is arranged centrally above the releasable opening of the at least one battery cell, and which in particular does not comprise any openings, wherein the atomizing device comprises lateral strips adjoining on both sides on the middle region in the second direction, which are inclined in the second direction in relation to the middle region in the direction of the upper side of the at least one battery module, wherein the at least one flame passage opening is arranged in at least one of the lateral strips.

Because these lateral strips are inclined in relation to the middle region and the flame passage opening is also arranged in such a lateral strip, the passage area is also inclined in relation to this middle region extending in parallel to the upper side of the battery cell, which permits the above-described deflection function by way of a particularly simple and cost-effective formation of the atomizing device. The lateral strips do not necessarily have to be formed flat in this case, but rather can also be shaped curved, for example. In such a case, the inclination mentioned of these lateral strips in the direction of the upper side is to be understood as an average inclination of these respective lateral strips. The atomizing device can be formed, for example, as a thin sheet extending in the longitudinal extension direction, which is curved away from the respective battery cells, wherein then the flame passage opening is not arranged in the central region of the atomizing device located directly above the releasable openings of the respective battery cells, but rather perpendicularly to the first direction and to the second direction extending laterally to the longitudinal extension direction. However, the atomizing device can also be provided as a sheet, which is not convexly curved, as described, but rather, for example, is formed trapezoidal, wherein then the trapezoid legs can be provided by the two lateral strips adjoining the middle region, as described. Of course, any other arbitrary geometrical design options of the atomizing device are also possible. Particularly efficient atomizing of escaping flames and moreover particularly efficient deflection thereof may be provided by the above-described variants.

It is furthermore advantageous in this case if the atomizing device comprises two flame passage openings associated with each respective battery cell, wherein one of the two flame passage openings associated with a respective battery cell is arranged in a respective one of the two lateral strips on opposing sides of the middle region, in particular wherein the lugs associated with a respective flame passage opening adjoin the middle region in the direction of a respective lateral strip. The above-mentioned edge region of the flame passage openings can thus represent a boundary region or a boundary line between the middle region and a respective relevant lateral strip. This represents a particularly efficient and simple formation of the atomizing device with respect to both the atomizing function and also the deflection function, to atomize the flames escaping from the releasable openings of the cell housings of the battery cell as efficiently as possible and to minimize the destructive extent thereof.

Furthermore, the invention also relates to a high-voltage battery having at least one battery module according to the invention or one of its designs. Moreover, the invention also relates to a motor vehicle having a battery module according to the invention or one of its designs or having a high-voltage battery according to the invention. The advantages mentioned for the battery module according to the invention and its designs thus apply similarly to the high-voltage battery according to the invention and the motor vehicle according to the invention.

The motor vehicle according to the invention is preferably designed as a motor vehicle, in particular a passenger vehicle or utility vehicle, or as a minibus or motorcycle. In addition, the motor vehicle according to the invention can represent, for example, an electric vehicle or a hybrid vehicle having electric drive.

The invention also comprises the combinations of the features of the described embodiments.

BRIEF DESCRIPTION OF THE DRAWINGS

Exemplary embodiments of the invention are described hereafter. In the figures.

DETAILED DESCRIPTION

The exemplary embodiments explained hereafter are preferred embodiments of the invention. In the exemplary embodiments, the described components of the embodiments each represent individual features of the invention to be considered independently of one another, which can each also refine the invention independently of one another. Therefore, the disclosure is also to comprise combinations of the features of the embodiments other than those illustrated. Furthermore, the described embodiments can also be supplemented by further ones of the above-described features of the invention.

In the figures, identical reference signs each identify functionally-identical elements.

Figure 1:
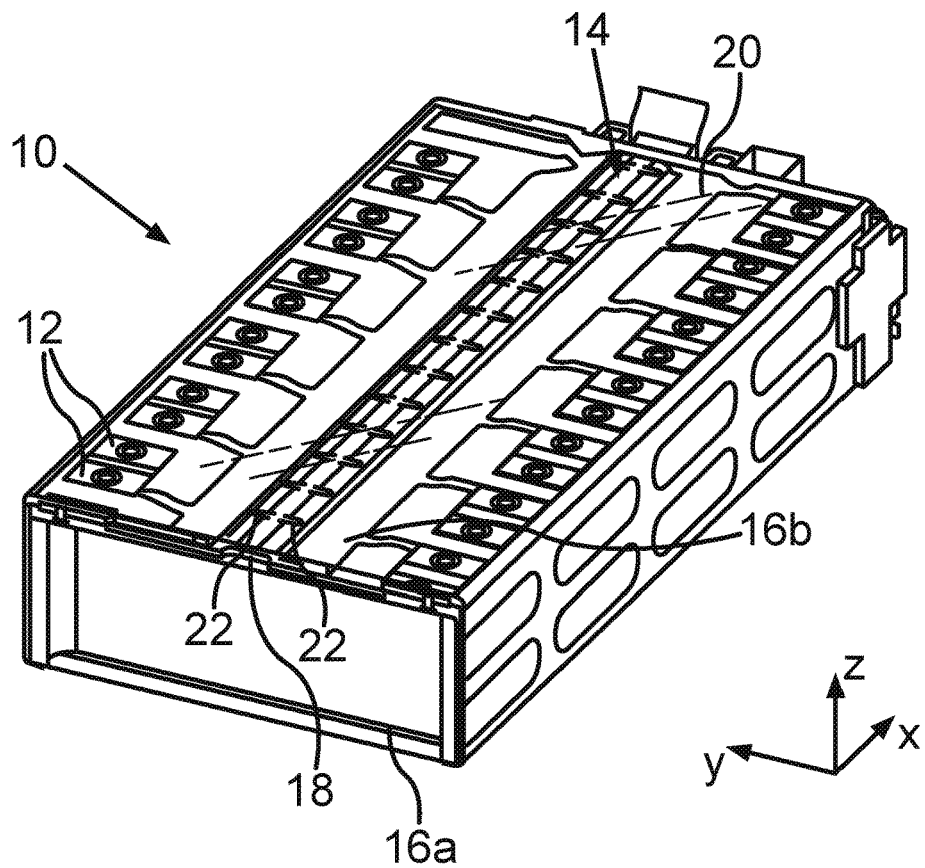
FIG. 1 shows a schematic and perspective illustration of a battery module having multiple battery cells and an atomizing device according to one exemplary embodiment of the invention.
Figure 2:
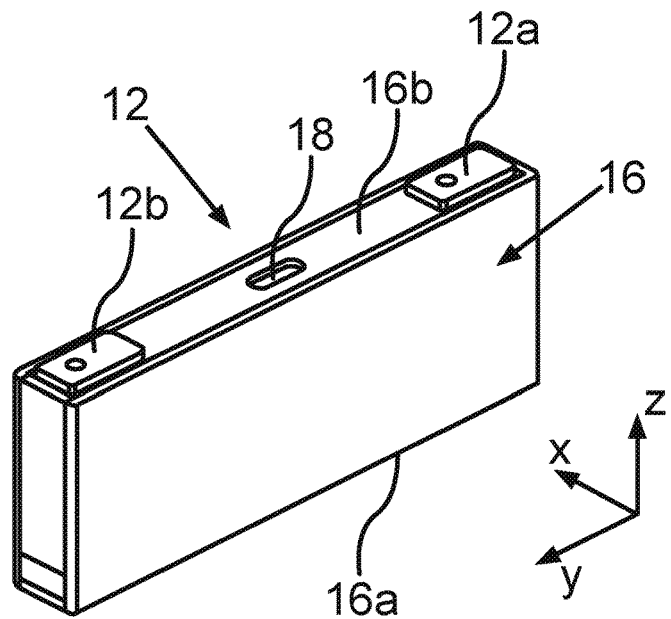
FIG. 2 shows a schematic and perspective illustration of a battery cell having an opening in the upper side which is releasable in the event of an overpressure in the battery cell for a battery module according to one exemplary embodiment of the invention.

FIG. 1 shows a schematic and perspective illustration of a battery module 10 having multiple battery cells 12 and an atomizing device 14 according to one exemplary embodiment of the invention. Of the battery cells 12, in this case only two are provided with a reference sign for reasons of clarity. Such a battery cell 12 is illustrated in detail schematically and in perspective once again in FIG. 2. The battery cells 12 comprised by the battery module 10 are furthermore arranged adjacent to one another in a longitudinal extension direction corresponding to the x direction of the illustrated coordinate system. Furthermore, these battery cells 12 are embodied as prismatic battery cells 12. A respective such battery cell 12, as is apparent in detail in FIG. 2, comprises in this case a cell housing 16, which comprises a lower side 16a and an upper side 16b, which is opposite to the lower side 16a in a first direction corresponding to the z direction of the illustrated coordinate system. Furthermore, the poles 12a, 12b of the battery cell 12 are arranged on the upper side 16b of the battery cell 12. Furthermore, the battery cell 12 comprises, in particular in the upper side 16b of its housing 16, an opening 18 releasable in the event of overpressure in the battery cell 12, which is arranged in this example in the middle between the cell poles 12a, 12b. This releasable opening can be embodied, for example, as an overpressure valve, in particular as a bursting membrane, which opens in the event of excessively high pressure inside the cell housing 16, which otherwise does not have any openings. As a result, in case of fault, for example, in the event of strong overheating of such a battery cell 12, as a result of which gases form inside the battery cell 16, a pressure compensation possibility can be provided, which prevents an explosion of the battery cell 12. If the releasable opening 18 opens in this case, in such a case of fault, an escape of a strong flame frequently also occurs. Such a flame typically contains many particles from the combustion of the electrolyte material of the battery cell 12 and the electrodes, which have a strong abrasive effect. Since the cell modules, for example, the battery module 10 illustrated in FIG. 1, are usually only covered by a thin plastic cap 20, as is also shown transparent by way of example in FIG. 1, such a flame in conventional battery modules penetrates very rapidly into the battery interior against a battery cover (not shown here). Since the battery covers are usually manufactured from aluminum, such a flame also penetrates this cover in a very short time. The hazard thus exists that vehicle parts outside the battery housing will be set on fire.

Figure 5:
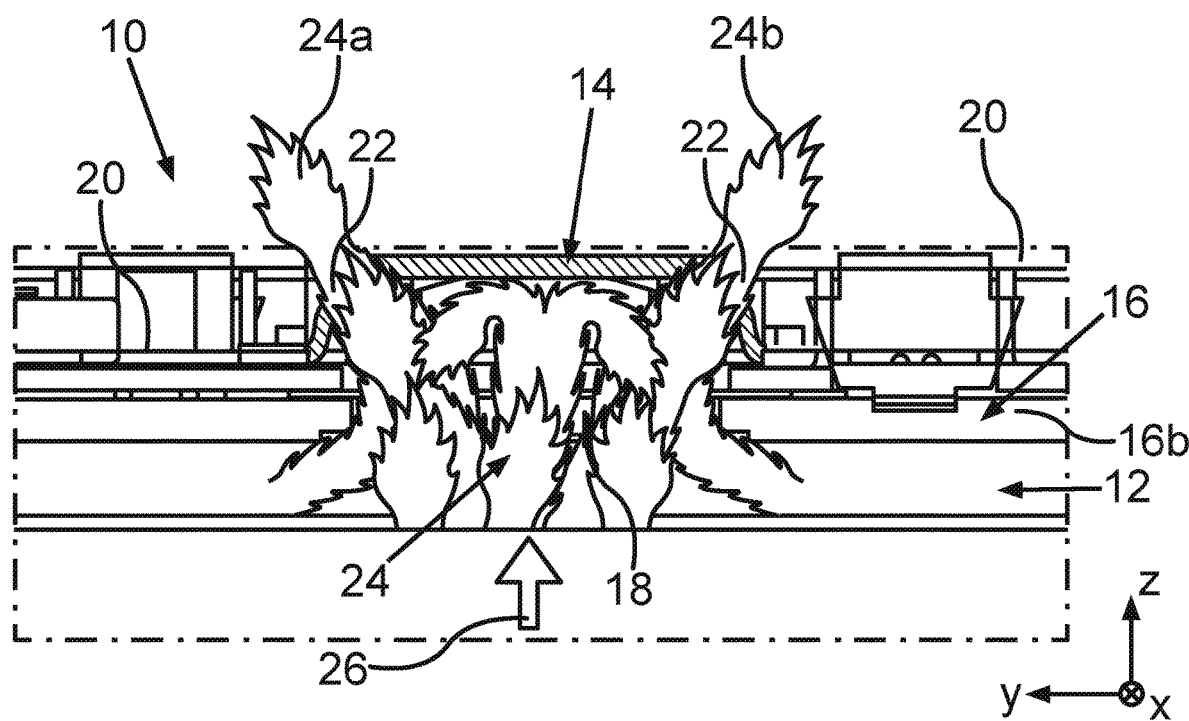
FIG. 5 shows a schematic cross-sectional illustration of a cross section through the battery module illustrated in FIG. 1 in a region of the atomizing device to illustrate the atomizing of flames escaping from a battery cell by the atomizing device according to one exemplary embodiment of the invention.

This risk can now advantageously be reduced in that an atomizing device 14 is arranged above these releasable openings 18. This atomizing device 14 is shown once again alone in the detail in FIG. 3 in a schematic and perspective illustration. This atomizing device 14 is formed in this case as an insert and consists of a fire-resistant material, primarily of steel, and moreover comprises one or more flame passage openings 22 in the region of the emergency degassing openings, i.e., the releasable openings 18 of the battery cells 12. In this example, this insert 14 comprises two such flame passage openings 22 per battery cell 12. For reasons of clarity, only two such flame passage openings 22 are also provided with a reference sign in this case in FIG. 1 and FIG. 3. These flame passage openings 22 comprise in this case a passage area, which is in each case smaller than an area of the releasable opening of a respective battery cell 12. A flame escaping from such a releasable opening 18 of the battery cell 12 can thus advantageously be atomized by these significantly smaller flame passage openings 22 in the atomizing insert 14 located above it. The destructive effect of this flame is thus significantly reduced. This atomizing of such a flame 24 is schematically illustrated in FIG. 5. FIG. 5 shows in this case a schematic cross-sectional illustration through a part of the battery module 10 from FIG. 1, in particular in the region of the atomizing device 14 and the releasable opening 18 located below it of a battery cell 12. As can be seen, in this case a flame 24 escapes from the battery cell 12 through the releasable opening 18, which is opened in this example due to the overpressure occurring in the battery cell 12. The original exit direction is illustrated in this case by the arrow 26, which extends substantially in parallel to the illustrated z direction, i.e., from bottom to top in the first direction. This exit region is largely closed by the atomizing device 14, however, so that this flame 24 can only still escape through the significantly smaller flame passage openings 22 in the atomizing device 14, whereby this flame 24 is divided into two partial flames 24a, 24b and is significantly weakened in this way.

However, not only such a division or atomizing of a flame 24 and thus a weakening of such a flame 24 may be effectuated by the atomizing device 14, but rather also a deflection of the partial flames 24a, as can also be clearly seen in FIG. 5. This may advantageously be effectuated by multiple design properties of the atomizing device 14, as will be explained in greater detail with the aid of FIG. 3. First, it is advantageous if the flame passage openings 22 are not oriented in parallel to the upper side 16b of the respective battery cells 12, but rather are inclined somewhat in relation to the illustrated x-y plane. A flame 24 is also laterally deflected by such an inclination as it passes through such an opening 22. This deflection effect is additionally also strengthened in that the relevant flame passage openings 22 are moreover not located centrally above the releasable opening on the relevant battery cell 12, but rather also are arranged laterally thereto, in this example on both sides, wherein laterally in this example relates to the illustrated y direction, i.e., perpendicular to the longitudinal extension direction x of the battery module 10, in which the battery cells 12 are arranged adjacent to one another, and also perpendicular to the first direction z, which defines a direction from the lower side 16a to the upper side 16b on the respective battery cell 12. The flame passage openings 22, which are associated with a respective battery cell 12, are thus arranged spaced apart from one another in the y direction laterally with respect to the releasable opening 18 of a respective battery cell 12. Due to this lateral arrangement, a deflection of a flame escaping from such a battery cell 12 is also effectuated if it passes through these flame passage openings 22 in the form of the described partial flames 24a, 24b.

Figure 3:
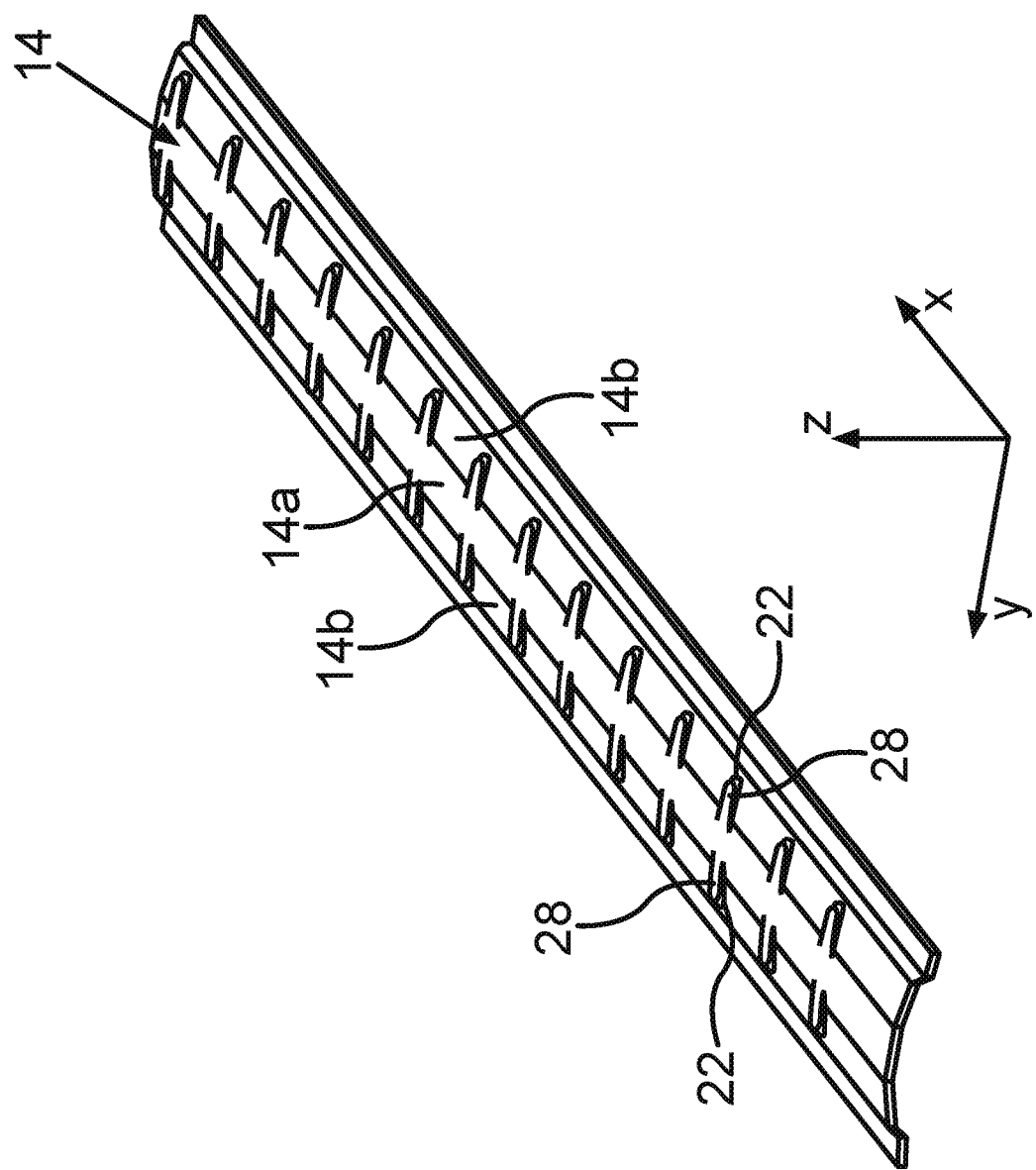
FIG. 3 shows a schematic and perspective illustration of an atomizing device for battery module according to one exemplary embodiment of the invention.
Figure 4:
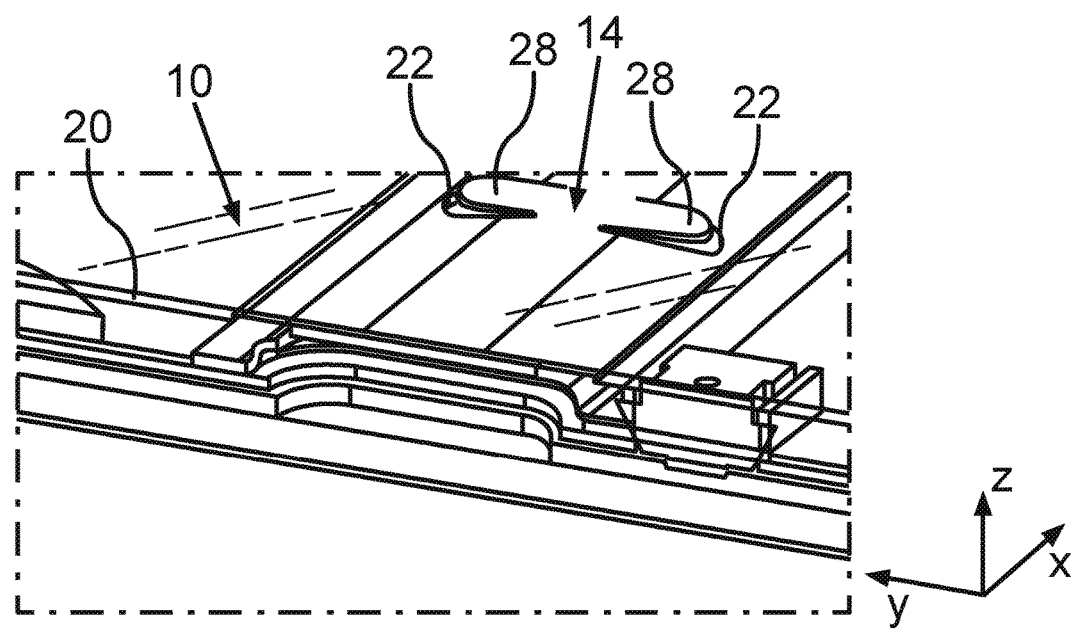
FIG. 4 shows a schematic and perspective illustration of a part of the battery module from FIG. 1 according to one exemplary embodiment of the invention.

In addition, the atomizing device 14 also comprises one associated lug 28 per flame passage opening 22, of which only two are also provided with a reference sign in FIG. 3 for reasons of clarity. FIG. 4 once again shows here a schematic and perspective detail view of a region of the battery module 10 having the atomizer insert 14, in which the flame passage openings 22 and also the associated lugs 28 are more clearly apparent in an enlarged illustration. These lugs 28 partially overlap the associated flame passage opening 22 and each protrude, originating from an edge region of the associated flame passage opening 22, in the direction of an opposing edge region of the flame passage opening 22. Moreover, these lugs 28 are also inclined by a small angle in relation to the passage area of the associated flame passage opening 22. In other words, these lugs 28 preferably extend essentially in parallel to the upper side 16b of the cell housing 16 of the respective battery cells 12, while the passage areas of the flame passage openings 22 are inclined in relation to this upper side 16b.

Due to these lugs 28, it is additionally possible to prevent the partial flames 24a, 24b of a flame 24 escaping from the battery cell 12 from passing vertically upward out of the flame passage openings 22, i.e., in the z direction. Therefore, a lateral deflection of these partial flames 24a, 24b, i.e., in and opposite to the illustrated y direction, is also advantageously forced by these lugs 28.

To provide these lugs 28 and the flame passage openings 22 in the described manner, the atomizing device 14 can comprise, for example, a strip-shaped middle region 14a, for example, extending in the longitudinal extension direction x and aligned in parallel to the upper side 16b of the respective battery cells 12, which is arranged centrally above the respective releasable openings 18 of the respective battery cells 12, and also furthermore lateral strips 14b adjoining on both sides on this middle region 14a in the second direction y, which are inclined in the second direction y in relation to the middle region 14a in the direction of the upper side 16b of the battery cells 12, in particular are inclined opposite to one another, wherein the respective flame passage openings 22 are arranged in these respective lateral strips 14b. The lugs 28 can then accordingly be formed as extensions of the middle region 14a in the second direction y. This insert 14 can then, for example, be simply clipped onto the upper side of the battery module 10 in a simple manner, whereby this insert 14 may be arranged in a particularly simple manner on the upper side of the battery module 10, in particular below the above-mentioned plastic cap 20.

As a whole, the examples show how an improvement of the fire protection of a lithium-ion battery having battery cells can be provided by the invention, in that an atomizing device in the form of a fire-resistant insert is provided in the region of the emergency degassing openings of the battery cells, which prevents a direct penetration of the abrasive flame to a battery cover arranged above the battery module. Since merely closing the openings would result in impermissibly high pressure buildup, in contrast, the flame can be scattered by defined openings in this insert. At the same time, the flame is distributed through one or more openings. The openings are advantageously selected here so that burning through the cover is prevented if possible, and nonetheless the pressure buildup in the battery remains in a permissible range.

The invention claimed is:

1. A battery module comprising:
    a plurality of battery cells, wherein each battery cell comprises a cell housing and a releasable opening, the cell housing comprising a lower side and an upper side opposite to the lower side in a first direction, and the releasable opening is arranged in the upper side and releases during an overpressure of a respective battery cell;
    an atomizing device, which is arranged in the first direction above the releasable openings of the plurality of battery cells, wherein the atomizing device comprises at least one flame passage opening, through which flames escaping from the releasable openings of the plurality of battery cells can penetrate, and the at least one flame passage opening has a passage area which is smaller than an area of each of the releasable openings,
    wherein the plurality of battery cells are arranged adjacent to one another in a longitudinal direction extending perpendicularly to the first direction, and the atomizing device is further arranged extending in the longitudinal direction so as to cover each of the releasable openings,
    wherein the atomizing device further comprises a strip-shaped middle region which extends in the longitudinal direction and is aligned above and parallel to the upper sides of the plurality of battery cells,
    wherein the atomizing device further comprises at least one lug formed with and protruding from the strip-shaped middle region to at least partially overlap the at least one flame passage opening, and each of the at least one lugs corresponds to one of the at least one flame passage opening,
    wherein the atomizing device further comprises lateral strips provided on each side of the strip-shaped middle region, formed with and thus adjacent to the strip-shaped middle region,
    wherein the lateral strips are formed inclined with respect to the strip-shaped middle region, towards the upper sides of the plurality of battery cells in a concave shape, and
    wherein the at least one flame passage opening is arranged on at least one of the lateral strips.

2. The battery module as claimed in claim 1, wherein the atomizing device comprises multiple flame passage openings spaced apart from one another.

3. The battery module as claimed in claim 2, wherein a surface normal of the passage area of the at least one flame passage opening is inclined at a non-zero angle with respect to the first direction.

4. The battery module as claimed in claim 2, wherein the at least one lug is inclined relative to the at least one flame passage opening by a non-zero angle.

5. The battery module as claimed in claim 1, wherein a surface normal of the passage area of the at least one flame passage opening is inclined at a non-zero angle with respect to the first direction.

6. The battery module as claimed in claim 5, wherein the at least one lug is inclined relative to the at least one flame passage opening by a non-zero angle.

7. The battery module as claimed in claim 1, wherein the at least one lug is inclined relative to the at least one flame passage opening by a non-zero angle.

8. The battery module as claimed in claim 7, wherein the lug is aligned in parallel to the upper side of the at least one battery cell and thus coplanar with the strip-shaped middle region.

9. The battery module as claimed in claim 1, wherein the strip-shaped middle region is arranged centrally above the releasable openings of the plurality of battery cells.

10. The battery module as claimed in claim 9, wherein the atomizing device comprises two flame passage openings associated with each of the plurality of battery cells,
    wherein a first of the two flame passage openings is arranged in a first of the lateral strips and a second of the two flame passage openings is arranged in a second of the lateral strips, the second of the lateral strips arranged on an opposing side of the strip-shaped middle region from the first of the lateral strips.

11. A high-voltage battery having a battery module with a plurality of battery cells,
    wherein each of the plurality of battery cells comprise a cell housing and a releasable opening, the cell housing comprising a lower side and an upper side opposite to the lower side in a first direction, and the releasable opening is arranged in the upper side and releases during an overpressure of a respective battery cell,
    wherein the battery module comprises an atomizing device, which is arranged in the first direction above the releasable openings of the plurality of battery cells, wherein the atomizing device comprises at least one flame passage opening, through which flames escaping from the releasable openings of the plurality of battery cells can penetrate, and the at least one flame passage opening has a passage area which is smaller than an area of each of the releasable openings, wherein the plurality of battery cells are arranged adjacent to one another in a longitudinal direction extending perpendicularly to the first direction, and the atomizing device is further arranged extending in the longitudinal direction so as to cover each of the releasable openings, wherein the atomizing device further comprises a strip-shaped middle region which extends in the longitudinal direction and is aligned above and parallel to the upper sides of the plurality of battery cells, wherein the atomizing device further comprises at least one lug formed with and protruding from the strip-shaped middle region to at least partially overlap the at least one flame passage opening, and each of the at least one lugs corresponds to one of the at least one flame passage openings, wherein the atomizing device further comprises lateral strips provided on each side of the strip-shaped middle region, formed with and thus adjacent to the strip-shaped middle region, wherein the lateral strips are formed inclined with respect to the strip-shaped middle region, towards the upper sides of the plurality of battery cells in a concave shape, and wherein the at least one flame passage opening is arranged on at least one of the lateral strips.

* * * * *